United States Patent
Donner et al.

(10) Patent No.: US 10,358,304 B2
(45) Date of Patent: Jul. 23, 2019

(54) PORTABLE LOADING RAMP

(71) Applicant: T&T Innovative Solutions, Inc., Fargo, ND (US)

(72) Inventors: Tyler Donner, New London, MN (US); Tyler Toepke-Floyd, Fargo, ND (US)

(73) Assignee: T&T Innovativ Solutions, Inc., Fargo, ND (US)

( * ) Notice: Subject to any disclaimer, the term of this patent is extended or adjusted under 35 U.S.C. 154(b) by 1 day.

(21) Appl. No.: 15/727,571

(22) Filed: Oct. 7, 2017

(65) Prior Publication Data

US 2018/0099824 A1   Apr. 12, 2018

Related U.S. Application Data

(60) Provisional application No. 62/405,707, filed on Oct. 7, 2016.

(51) Int. Cl.
*E01D 1/00* (2006.01)
*B65G 69/30* (2006.01)
*B60P 1/43* (2006.01)

(52) U.S. Cl.
CPC ............. *B65G 69/30* (2013.01); *B60P 1/43* (2013.01)

(58) Field of Classification Search
CPC ................................ B65G 69/30; A61G 3/061
USPC ........................................... 14/69.5; 414/537
See application file for complete search history.

(56) References Cited

U.S. PATENT DOCUMENTS

| | | | | |
|---|---|---|---|---|
| 3,912,139 A | * | 10/1975 | Bowman | B60R 9/00 211/22 |
| 4,528,711 A | * | 7/1985 | Packer | B65G 69/30 14/69.5 |
| 4,823,997 A | * | 4/1989 | Krieger | B60R 9/06 224/42.15 |
| 5,325,558 A | * | 7/1994 | Labreche | A61G 3/061 14/69.5 |
| 5,538,308 A | * | 7/1996 | Floe | B60P 1/435 296/61 |
| D373,885 S | * | 9/1996 | Holland, Jr. | D34/32 |
| D398,129 S | * | 9/1998 | Sacks | D34/32 |
| 5,853,281 A | * | 12/1998 | Farmer | B65G 39/07 193/35 R |
| 5,988,722 A | * | 11/1999 | Parri | B60P 1/003 224/403 |
| D430,377 S | * | 8/2000 | Collins | D34/32 |
| 6,345,950 B1 | * | 2/2002 | Gerwitz | B65G 11/143 14/71.1 |
| 6,536,064 B1 | * | 3/2003 | Swink | B60P 1/431 14/69.5 |
| 6,543,985 B1 | * | 4/2003 | Harstad | B60P 3/062 414/537 |
| 6,701,563 B2 | * | 3/2004 | Schomaker | B60P 1/43 14/69.5 |
| 6,837,669 B2 | * | 1/2005 | Reed | B60P 1/43 14/69.5 |

(Continued)

FOREIGN PATENT DOCUMENTS

DE    202006002745 U1    8/2006

*Primary Examiner* — Thomas B Will
*Assistant Examiner* — Katherine J Chu
(74) *Attorney, Agent, or Firm* — Danielson Legal LLC

(57) ABSTRACT

A loading device for users to move vehicles onto an elevated platform, using an inclined structure formed of a plurality of horizontal sections that are each adjustable so as to adjust the width of the inclined structure.

19 Claims, 8 Drawing Sheets

(56) References Cited

U.S. PATENT DOCUMENTS

| | | | |
|---|---|---|---|
| D505,238 S * | 5/2005 | Robertson | D34/32 |
| 7,013,518 B2 * | 3/2006 | Leblanc | B60P 1/43 14/69.5 |
| D523,389 S * | 6/2006 | Ezra | D12/406 |
| 7,082,637 B1 * | 8/2006 | Griffin | B65G 69/30 14/69.5 |
| 7,100,231 B2 * | 9/2006 | Peschmann | B65G 69/30 14/24 |
| 7,179,042 B1 | 2/2007 | Hartman et al. | |
| 7,182,380 B2 * | 2/2007 | Nagle | B60P 3/40 296/26.11 |
| D539,211 S * | 3/2007 | Ezra | D12/406 |
| D548,671 S * | 8/2007 | Ezra | D12/406 |
| 7,258,384 B2 * | 8/2007 | Drabik | B60P 1/435 14/69.5 |
| 7,284,781 B2 * | 10/2007 | Grant | B60P 1/435 296/57.1 |
| 7,445,268 B2 * | 11/2008 | Faulkiner | B60P 1/431 296/183.1 |
| 7,549,692 B2 * | 6/2009 | Washington | B60P 1/435 296/61 |
| 7,926,139 B2 * | 4/2011 | Metcalfe | B65G 69/30 14/69.5 |
| 8,371,427 B1 * | 2/2013 | Miklos | B65G 69/30 193/35 A |
| 8,959,693 B2 * | 2/2015 | Pohlman | E01D 1/00 14/69.5 |
| 9,017,004 B1 * | 4/2015 | Brown, Jr. | B60P 1/435 414/537 |
| 9,199,569 B2 * | 12/2015 | Justak | B65G 69/30 |
| 9,587,405 B1 * | 3/2017 | Alhazza | E04F 11/002 |
| 9,670,013 B2 | 6/2017 | Parrish | |
| 9,676,315 B1 * | 6/2017 | Davis | B65G 69/30 |
| 9,745,153 B2 * | 8/2017 | Pelzer | B65G 69/30 |
| 9,777,535 B1 * | 10/2017 | Stentiford, Sr. | E06C 7/08 |
| 10,012,022 B1 * | 7/2018 | Stentiford, Sr. | E06C 7/08 |
| 2004/0160079 A1 * | 8/2004 | Harper | B62D 33/03 296/61 |
| 2004/0223836 A1 * | 11/2004 | Robertson | B60P 1/43 414/537 |
| 2009/0178214 A1 * | 7/2009 | Gang | B65G 69/30 14/69.5 |
| 2010/0092271 A1 * | 4/2010 | Richardson | B60P 3/07 414/537 |

* cited by examiner

PORTABLE LOADING RAMP

CROSS-REFERENCE TO RELATED APPLICATIONS

This application claims priority to and the benefit of U.S. Provisional Appl. No. 62/405,707, filed on Oct. 7, 2016, the contents of which are hereby incorporated by reference as if set forth in their entirety herein.

TECHNICAL FIELD

Embodiments of the present invention relate to wheeled vehicles, and more specifically to loading these vehicles.

BACKGROUND

Often a user needs to transport recreational or utility vehicles to some location and back, making moving to and from the locations critical. A common way to load these vehicles from the ground onto an elevated plane such as a truck or trailer is a ramp.

Conventional wheeled vehicle loading devices have their downsides as they are difficult to operate, transport and store. Current ramps come in various shapes and sizes and are designed to be used with a variety of vehicles. Through a series of operations, current ramps may transform to a more portable shape than the original loading configuration; however, these ramps are still difficult to store and transport.

Single lane ramps are independent pieces that lack stability and grant twice the difficulty in storage and transportation because two ramps are needed to load a standard four-wheeled vehicle.

Three lane longitudinal folding ramps are difficult to store because the folding operation does not decrease the overall length of the ramp resulting in an object long and difficult to handle.

Width-wise folding ramps decrease the overall length of the ramp but not the width resulting in a bulky compromise that is equally as difficult to transport, handle, and store.

There also exist other ramps or loading systems that permanently remain attached to the platform. The disadvantage to these devices is that after the initial installation they are dedicated to the loading platform rendering it much less useful for other applications. This is important as a common loading platform is a truck bed which is designed to carry and transport a variety of objects. With a permanently attached apparatus, the truck bed becomes much less useful.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

The present invention is a ramp for users to move vehicles onto an elevated platform, such as a trailer or truck. As a result of improved collapsing operations, this ramp has the advantage of being a smaller and more user-friendly object that is easier to transport and store. This advantage is obtained using a novel collapsing and folding design that permits its sections to slide together in a sideways translating fashion and fold over each other, creating a shape that is smaller and more portable than other commercially-available ramps. When unfolded and fully extended, the ramp is wide enough and long enough for loading common utility and all-terrain vehicles at a standard, safe loading angle. Another benefit to this ramp is that the ramp has spring loaded locks to position the ramp at two set widths. Additionally, the sliding action of the ramp allows the ramp to take many variable widths for loading any variety of vehicles between the ramp's skinniest and widest settings. Overall, this ramp solves the problems of bulky and less portable ramps by yielding a smaller storage size while still being versatile to accommodate a wide variety of applications.

In one aspect, embodiments of the present invention relate to a portable ramp having a plurality of sections, each section having a plurality of pieces adjustably interconnected, the sections being connected by at least one hinge.

In one embodiment, the width of the ramp in its collapsed configuration is at least one third of the width of the ramp in its expanded configuration and the length of the ramp in its collapsed state is one half of the length of the ramp in its extended state.

In one embodiment, the plurality of pieces are interconnected with telescoping crossbeams. In one embodiment, the at least one telescoping crossbeam further comprises a spring lock. In one embodiment, the ramp comprises at least two telescoping crossbeams, and the two telescoping crossbeams are interlocking.

In one embodiment, the width of the ramp is continuously adjustable.

In one embodiment, the width of the ramp assumes at least two fixed values.

In one embodiment, the crossbeams are orthogonally interconnected to the rails in an overlapping, interlocking fashion.

In another aspect, embodiments of the present invention relate to a process for deploying a portable ramp. The process includes providing a ramp comprising a plurality of sections, each section comprising a plurality of pieces adjustably interconnected, the sections being connected by at least one hinge; unfolding the ramp at the at least one hinge; and adjusting the width of the ramp by expanding each of the plurality of sections.

In one embodiment, the method further includes sliding each of the plurality of sections together; and folding the ramp at the at least one hinge.

In one embodiment, the method further includes attaching the ramp to the back of a platform. In one embodiment, the platform is a truck bed.

In one embodiment, the method further includes driving an all-terrain vehicle up the ramp to the platform.

In one embodiment, the method further includes detaching the ramp from the back of a platform.

In one embodiment, the method further includes transporting the ramp on an all-terrain vehicle for future use as a bridge to go over obstacles.

According to yet another aspect, embodiments relate to a method of manufacturing a ramp. The method includes providing a first set of a plurality of rails; providing a second set of a plurality of rails; connecting a first rail of each set to a second rail of the same set using a plurality of beams with a first diameter; connecting a third rail of each set to the second rail of the same set using a plurality of beams with a second diameter that is different from the first diameter, such that the plurality of beams with the second diameter are co-axial with the plurality of beams with the first diameter; and attaching the first set of rails to the second set of rails using at least one hinge.

These and other features and advantages, which characterize the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF THE DRAWINGS

Non-limiting and non-exhaustive embodiments are described with reference to the following figures in which.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

In overview, various embodiments described herein are directed to a loading device that facilitates the movement of another object to an elevated level above the ground using at least two interconnected members. The features of various embodiments allow for improved portability and storage while retaining strength and reliability. The loading device (hereinafter "ramp") described herein utilizes a novel collapsing and folding design that permits its sections to slide together (e.g., in a sideways translating fashion) and to fold to create a shape that is smaller and more portable than other commercially-available devices.

When unfolded and extended, the ramp may be wide enough to load, for example, UTV's and ATV's at a user-friendly loading angle. Accordingly, the ramp described herein solves the problem of bulky, fixed devices known in the art by enabling a smaller storage size while still being versatile to accommodate a wide variety of applications.

Figure 1:
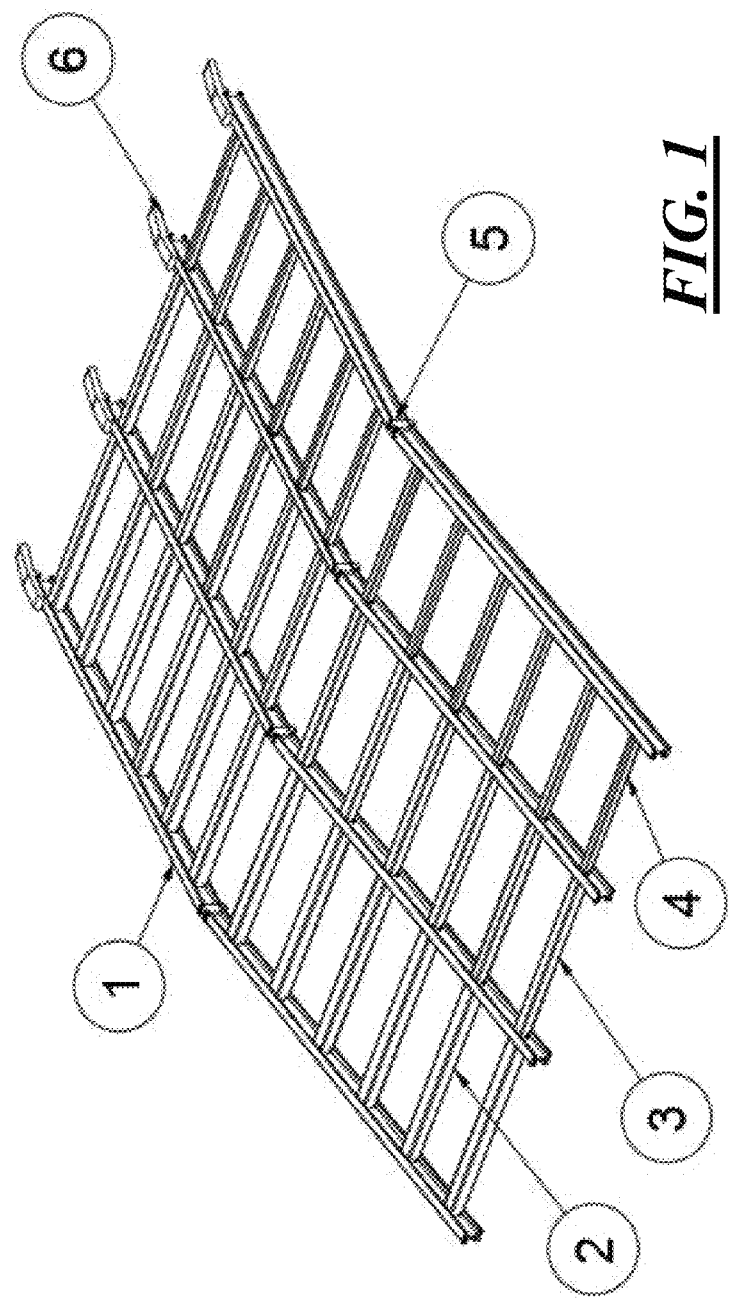
FIG. 1 is a perspective view of a ramp fully extended and unfolded in accordance with one embodiment.

Referring now to FIG. 1 in more detail, there is shown a ramp fully extended and unfolded, having three separate sections that translate horizontally to change the usable width of the ramp.

The embodiment of FIG. 1 shows a ramp that is three lanes wide for use with applications that require more width for loading. An example of this would be loading a four-wheeled vehicle.

In further detail, still referring to the invention of FIG. 1, when positioned at the device's widest standard setting, the ramp is sufficiently wide for loading most utility and recreational vehicles, (for example, 45 to 65 inches wide). Equally important, the length of the ramp and height of the platform determines the loading angle for the object being loaded. The ramp's length can be varied in initial fabrication from, for example, 84 to 144 inches long to accommodate a variety of vehicles being loaded. In other embodiments, the ramp length may be extendible in operation or between operations.

Component 1 denotes a rail or a structural member running the length of the ramp. This component is interconnected orthogonally with the crossbeams as exemplified by component 2.

Components 2, 3, and 4 denote the three separate sections that translate horizontally to change the usable width of the ramp. These crossbeams 2, 3, and 4 allow for a horizontal sliding action as one beam can slide past another. This is possible because the cross beams of each section can be assembled so that they are co-axial, with the cross beam of one section fitting inside the adjacent cross beam of the other section. The crossbeams 2, 3, and/or 4 may be configured with locking mechanisms (e.g., spring-locks) to lock the crossbeams, and therefore the rails 1, in place. In this sense, the ramp effectively embodies the form of three standard widths or the invention can be positioned to a variety of widths by adjusting 2, 3, and 4 relative to each other. It would be apparent to one of ordinary skill that other embodiments may have varying numbers of sections (e.g., two, four, etc.), setting the maximum width of the embodiment to the width of the individual components at their full extension.

Component 5 is a hinge piece which allows the ramp to fold in half. This decreases the length by a factor of two allowing the ramp to become a more portable shape. These components are designed to withstand a compressive force when a load is applied to the ramp. As mentioned before, the hinge piece can have a variety of angles to adjust the loading angle of the ramp based on user input during initial fabrication. In some embodiments, the hinge piece can be configured to alter the loading angle during operation.

The arm, component 6, is designed to rest on the edge of the loading platform. This component transfers the load at the top of the ramp to the loading platform (not shown). The angle of these components is related to the angle of component 5.

As shown in FIG. 1, the base construction of each section of the invention is composed of rails (1) running the length of the ramp and crossbeams (the individual components denoted by 2, 3, and 4) spanning the width of the ramp. The geometry of these components is designed in such a way that these components interlock and are fixed to create a rigid structure that can still be manipulated.

The crossbeams 2, 3, 4 are interconnected to the rails 1. This results in a distribution of force across the entire section of the ramp when a load is applied to a single crossbeam. The crossbeams 2, 3, 4 are spaced at a set width such that a wheel of a standard utility or all-terrain vehicle will span the gap between crossbeams. The components of the ramp may be hollow geometric to reduce the overall weight of the ramp.

Figure 2:
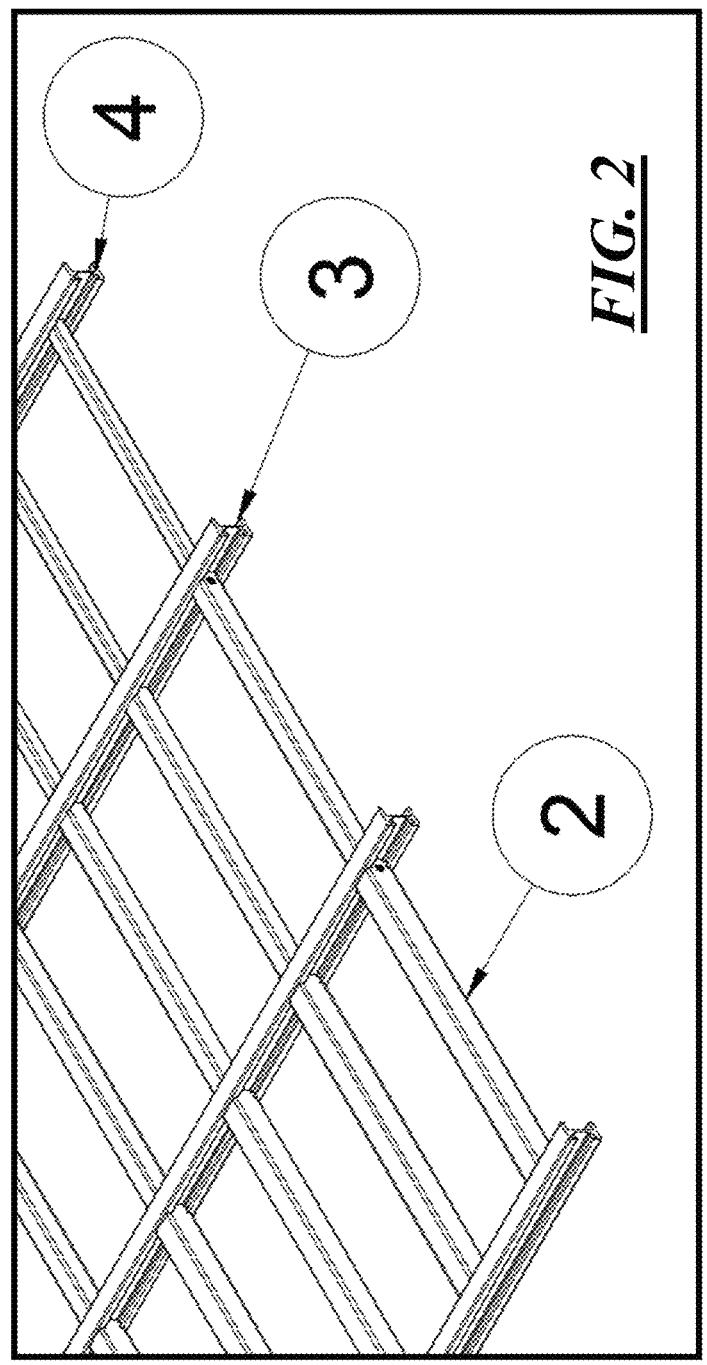
FIG. 2 is a perspective view of the bottom edge of the ramp of FIG. 1 illustrating the crossbeam locking holes in accordance with one embodiment.

In reference to FIG. 2, there is shown the bottom end of the ramp. In this representation, the ramp is fully extended and the locking holes of the crossbeams have been aligned, thereby locking the ramp into its widest setting.

Figure 3:
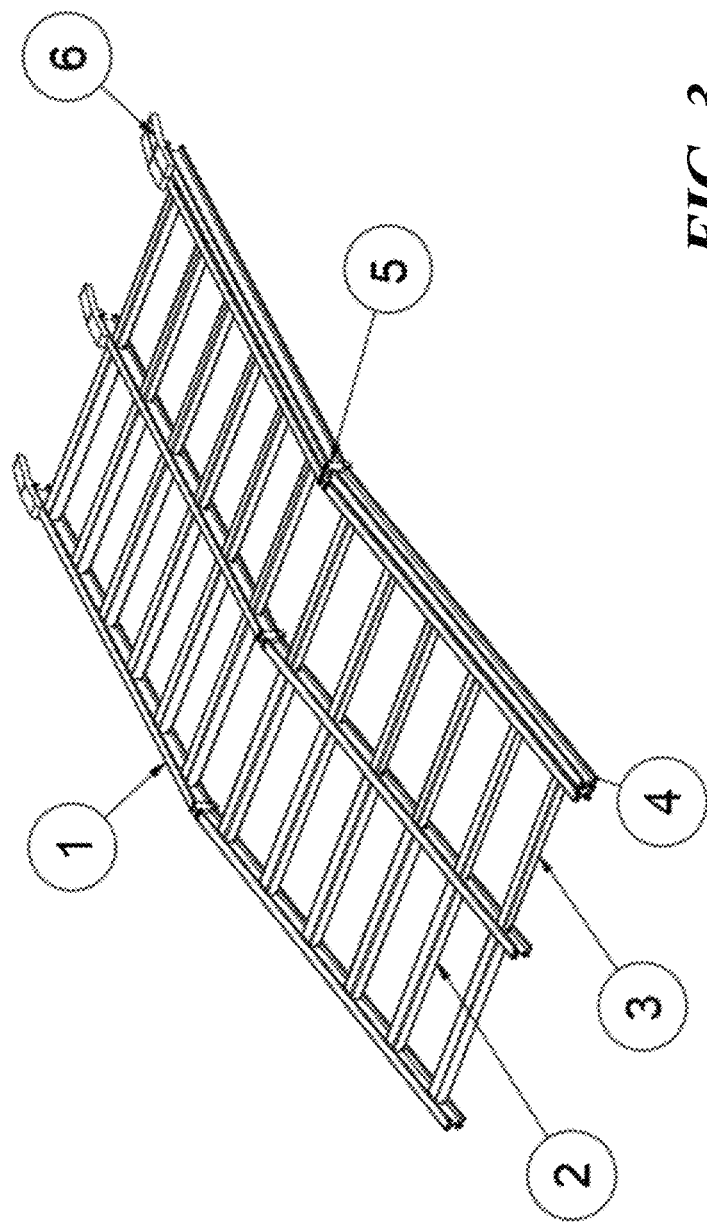
FIG. 3 is a perspective view showing the ramp of FIG. 1 partially extended and fully unfolded in accordance with one embodiment.

Now referring to FIG. 3, there is shown the same ramp as in FIG. 1 with the farthest section to the right (component 4) collapsed, or translated, into the middle section 3. The embodiment in FIG. 3 results in a ramp that is 2 lanes wide for use with applications that require less width for loading and/or unloading. An example of this would be loading a two-wheeled vehicle with a walking lane.

Figure 4:
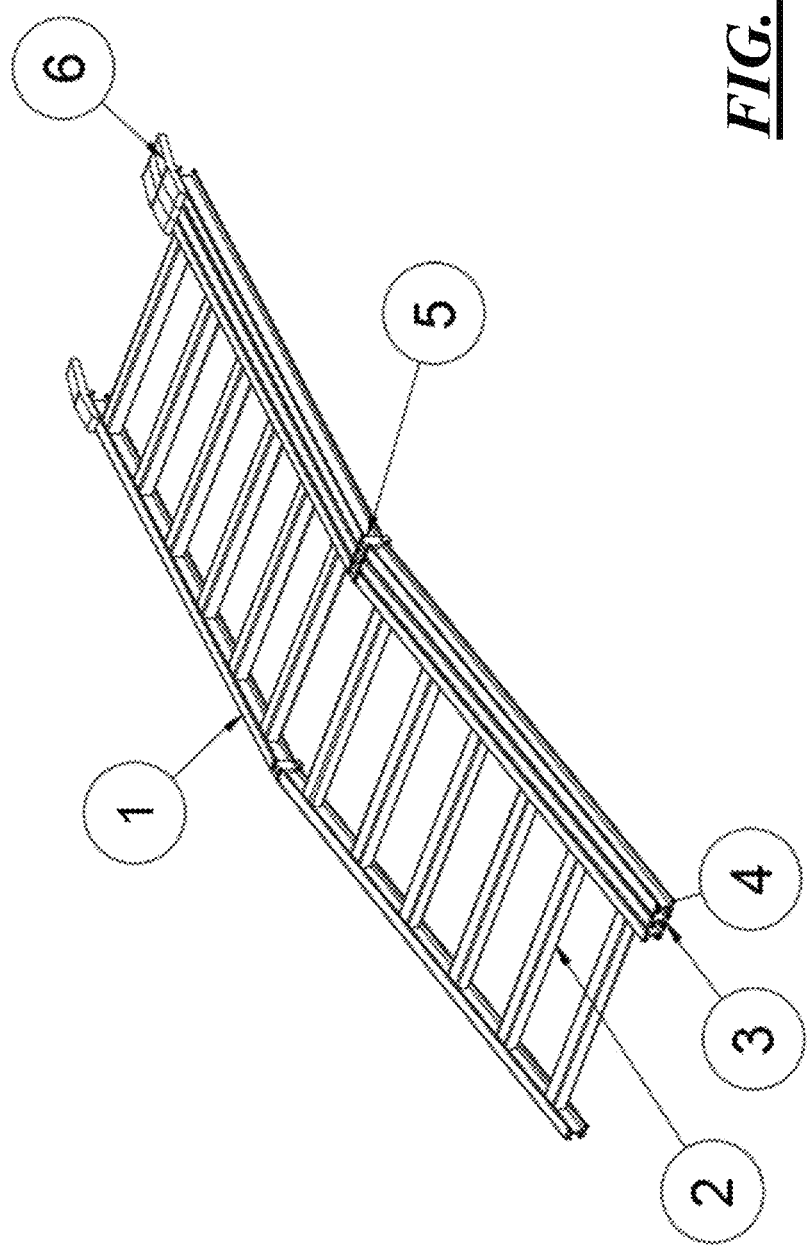
FIG. 4 is a perspective view showing the ramp of FIG. 1 fully unfolded but not extended in accordance with one embodiment.

Continuing to FIG. 4, there is shown the same ramp as previously mentioned with the two right most sections (components 3 and 4) collapsed, or translated, into the farthest left section. This results in a single lane ramp minimizing the width when extra width is not required. An example of this application would be loading a two-wheeled vehicle without a walking lane. The embodiment in FIG. 4 represents the smallest width the ramp can take.

Figure 5:
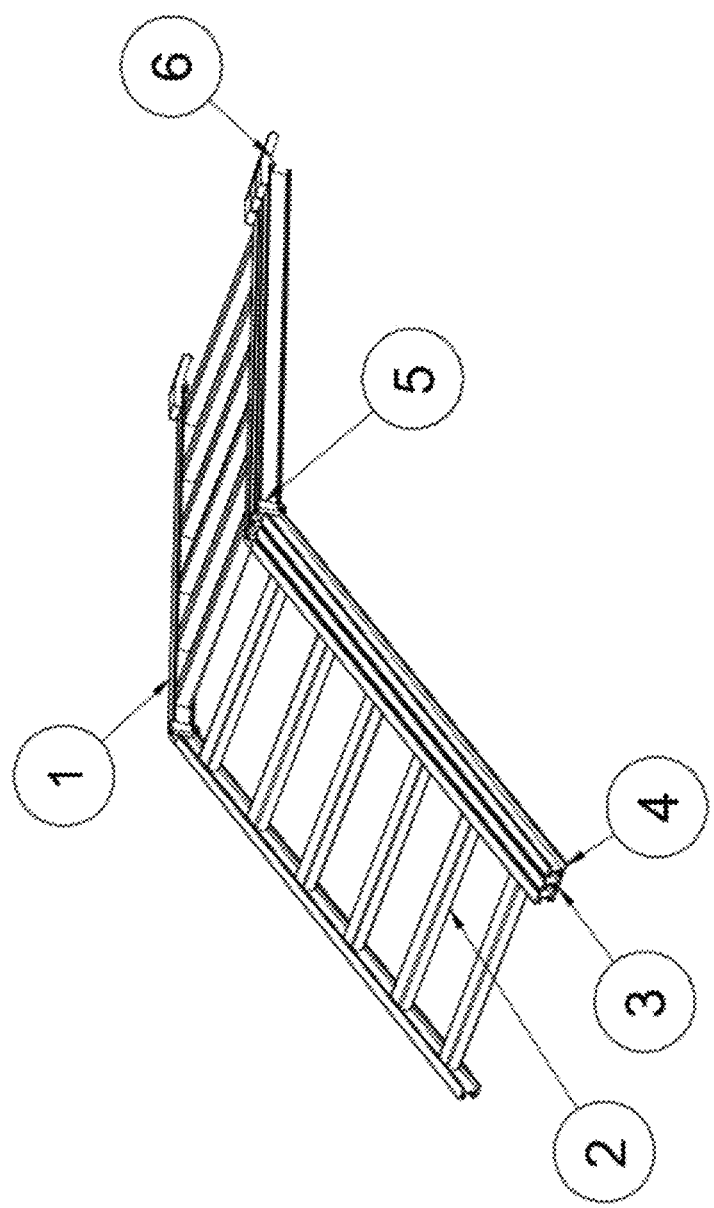
FIG. 5 is a perspective view showing the ramp of FIG. 1 fully collapsed and in the process of being folded in accordance with one embodiment.

Referring now to FIG. 5, there is shown the ramp in the process of being folded. The hinges (component 5) allow the ramp to pivot, creating two halves that can fold on top of each other. This allows the length of the ramp to decrease for transport and storage.

Figure 6:
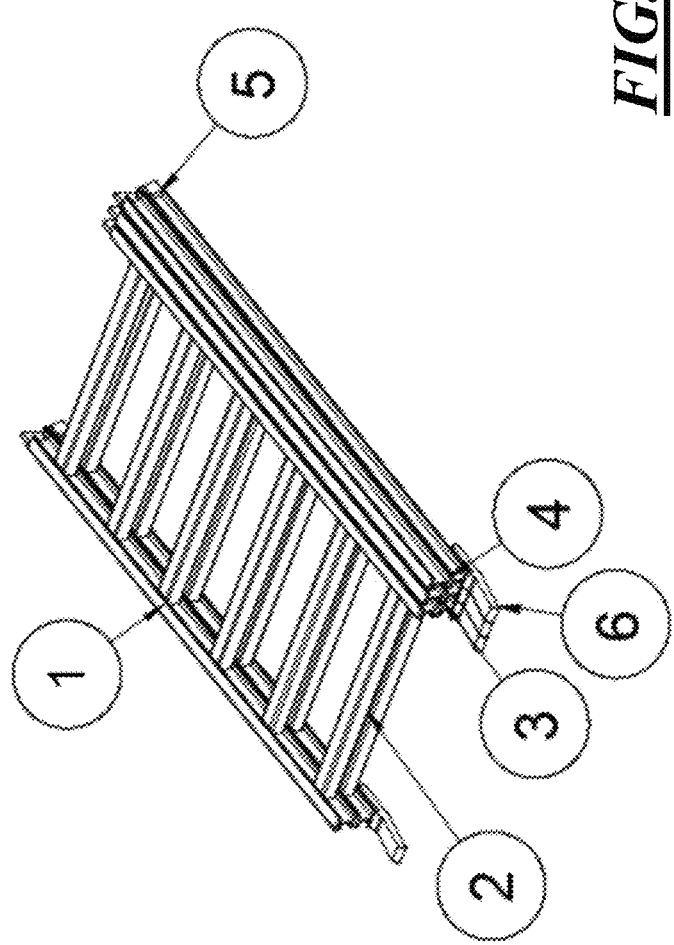
FIG. 6 is a perspective view showing the ramp of FIG. 1 not extended and folded in accordance with one embodiment.

Referring now to FIG. 6, there is shown the ramp in its smallest and most portable form. This embodiment is obtained after a folding operation has been performed in addition to the collapsing operations previously described. The representation shown in FIG. 6 shows the two halves of the ramp folded on top of each other and connected by hinges 5.

The embodiment in FIG. 6 has been configured to take up as little space, volume, as possible. Examples of how this beneficial aspect of the invention could be used include: storing the ramp in a closet or cabinet in a garage, in an overhead storage compartment of a vehicle, inside a vehicle, in and around an ATV that is loaded into a truck or elevated platform, or the like. The embodiment in FIG. 6 also grants the ability to transport the ramp on the off-road vehicle that was previously loaded for future use when the off-road vehicle is in a separate location than the transport vehicle.

Figure 7:
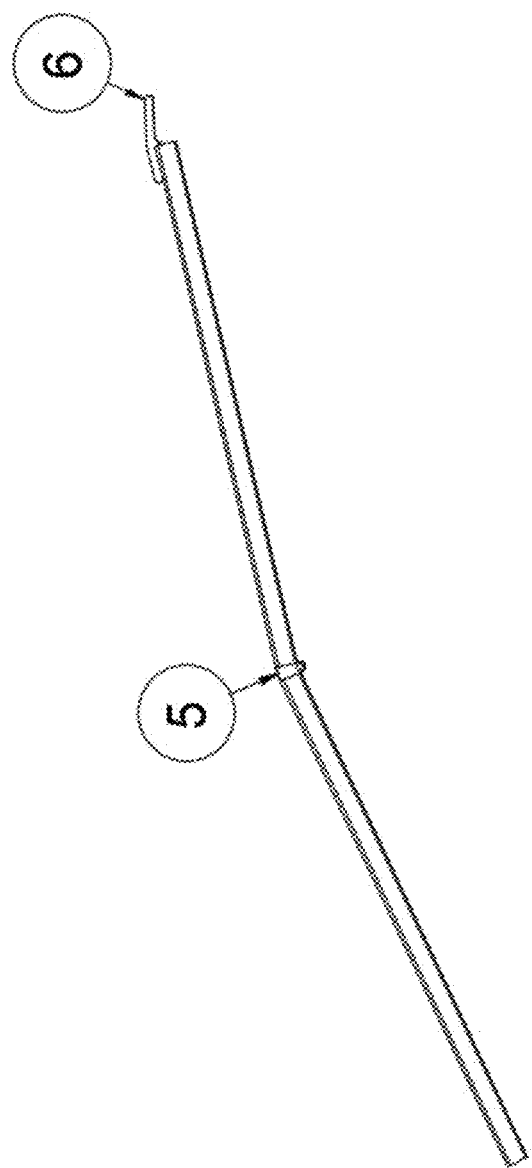
FIG. 7 is a side view of the ramp in the position of FIG. 1 in accordance with one embodiment.

As previously mentioned, in addition to the length of the ramp and the height of the loading platform being factors influencing the loading angle, the angled hinge (component 5) in the middle of the ramp can also affect the loading angle. Referring to FIG. 7, the side view of the invention shows how the lower and upper sections are not collinear, i.e., the hinge (component 5) between the upper and lower portions changes the loading angle by a specified amount. This is done to optimize the angle at the top of the ramp to accommodate for lower profile vehicles.

The angle of the hinge 5 can be varied by any amount in the manufacturing process to make the upper and lower portions of the ramp collinear if need be. In some embodiments, the angle of the hinge 5 can be configured in operation.

The construction details of the invention as shown in the figures are such that the components may be made of aluminum or of any other sufficiently rigid and strong material such as high-strength plastic, metal, composite, and the like. Further, the various components of the ramp can be made of different materials suitable for fabrication and their specific application.

Additional attachments may be added or original components may be modified for the purpose of obtaining better grip for the wheels or for lubrication in the sliding action of the cross beams. For example, the ramp may be configured with head mounts, footers, cross-beam locking mechanism, lubricants, grip additives, or the like.

The components of this ramp can be fastened or fixed to one another through welding, epoxy bonding, or mechanical fasteners such as bolts or pins.

The collapsing operation illustrated in FIGS. 1-6 results in an overall reduction of required storage space. For example, the ratio of the volume occupied by the ramp as shown in FIG. 1 to the ramp as shown in FIG. 6 may be approximately 1:5.

The process discussed above can be applied in reverse to fully open the ramp for use as a loading assistant device from the storage state of the device. One of ordinary skill would also recognize that the folding, extension, and collapsing steps can be performed interchangeably depending on the operator's preference.

Figure 8:
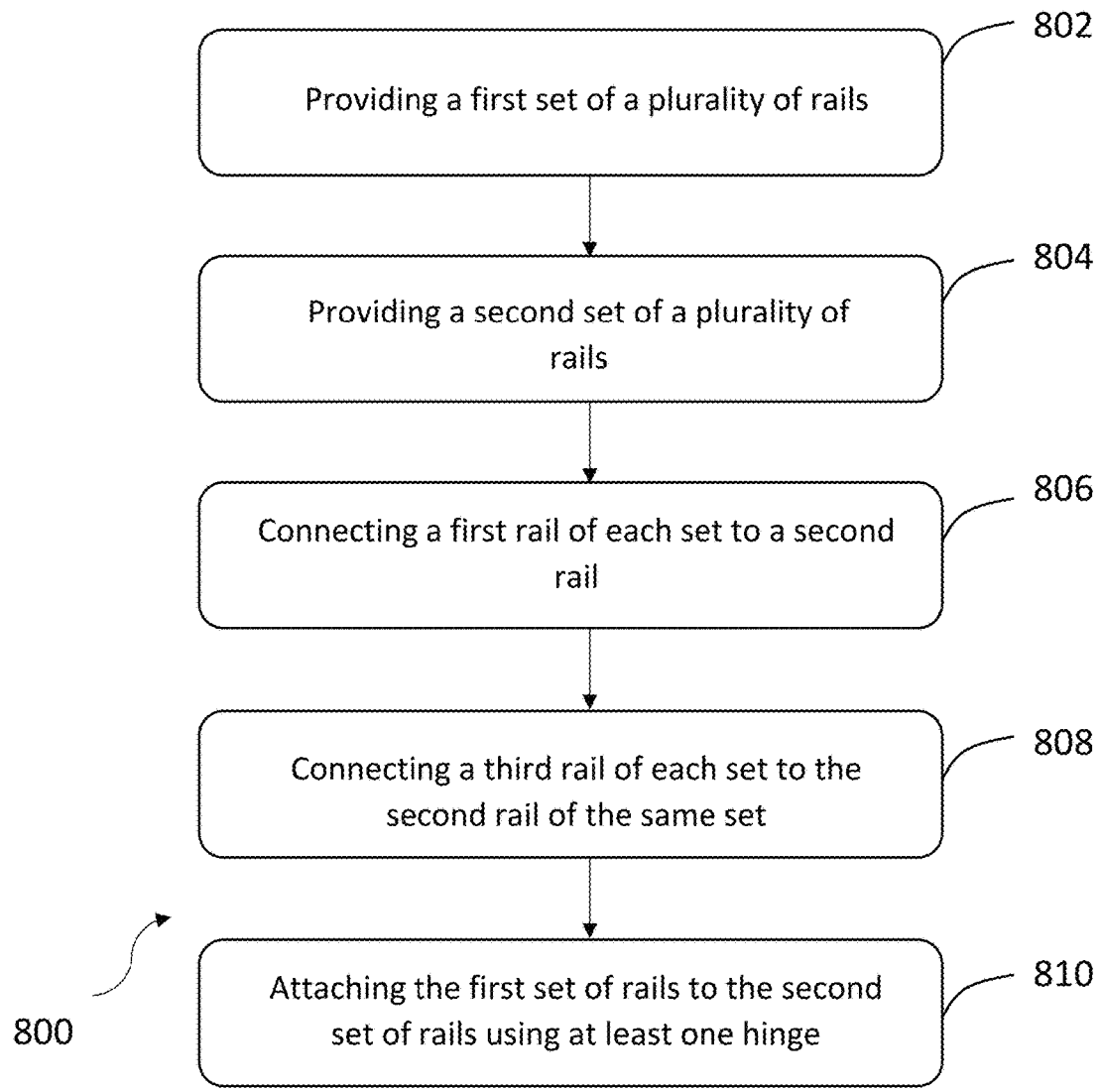
FIG. 8 depicts a flowchart of a method of manufacturing the ramp of FIG. 1 in accordance with one embodiment.

FIG. 8 depicts a flowchart of a method 800 of manufacturing a ramp in accordance with one embodiment. Steps 802 and 804 involve providing a first set of a plurality of rails and a second set of a plurality of rails, respectively. These rails may be similar to the rails 1 of FIG. 1, for example. Each set may include three or four rails, for example.

Step 806 involves connecting a first rail of each set to a second rail of the same set using a plurality of beams with a first diameter. These beams may be similar to the interconnecting beams 2 of FIG. 1, for example, and may secure two rails together.

Step 808 involves connecting a third rail of each set to the second rail of the same set using a plurality of beams with a second diameter that is somewhat greater than the first diameter. These beams should have a somewhat greater diameter than the first set of beams so they can slide over the plurality of beams with the first diameter to collapse the ramp, as shown in FIG. 3, for example.

Step 810 involves attaching the first set of rails to the second set of rails using at least one hinge. The hinge(s) may be similar to the hinge 5 of FIG. 1, for example. Accordingly, the ramp has two halves joined together by a hinge, where each half includes rails that can collapse into each other by virtue of sliding interconnecting beams.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

The description and illustration of one or more embodiments provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

What is claimed is:

1. A portable ramp comprising:
   a first outer rail, having a top end and a bottom end, the distance of the first outer rail from the top end to the bottom end equal to the length of the ramp;
   a second outer rail, the distance from the first outer rail to the second outer rail equal to the width of the ramp;
   at least one hinge connecting a first section of the first outer rail to a second section of the first outer rail;
   a first middle rail; and
   a plurality of adjustable, telescoping crossbeams connected between the first outer rail and the second outer rail, each crossbeam having a first end and a second end and comprising at least two crossbeam sections, wherein:
     a first crossbeam section is coupled to the first outer rail at the first end of the crossbeam;
     a second, hollow, crossbeam section co-axial to the first crossbeam section is coupled to the first middle rail;
     the second crossbeam section is coupled to the second outer rail at the second end of the crossbeam;
     the second crossbeam section encompasses the first crossbeam section when the ramp is fully horizontally collapsed;
     the distance from the first end of the crossbeam to the second end of the crossbeam, added to the width of the first outer rail and the second outer rail, is equal to the width of the ramp; and
     the distance between the first outer rail and the first middle rail increases when the ramp is horizontally expanding.

2. The ramp of claim 1 wherein the width of the ramp in its horizontally collapsed configuration is at least one third of the width of the ramp in its horizontally expanded configuration and the length of the ramp in its vertically collapsed configuration is one half of the length of the ramp in its vertically expanded configuration.

3. The ramp of claim 1 wherein at least one telescoping crossbeam further comprises a spring lock.

4. The ramp of claim 1 wherein the telescoping crossbeams are interlocking.

5. The ramp of claim 1 wherein the width of the ramp is continuously adjustable.

6. The ramp of claim 1 wherein the width of the ramp assumes at least two fixed values.

7. The ramp of claim 1 wherein the crossbeams are orthogonally interconnected to the first middle rail, first outer rail, and the second outer rail in an overlapping, interlocking fashion.

8. The ramp of claim 1 wherein the adjustable crossbeams are spaced to directly support a vehicle.

9. The ramp of claim 1 wherein the ramp is configured to support a vehicle in at least one of:
   its vertically expanded and horizontally collapsed configuration; and
   its horizontally expanded and vertically collapsed configuration.

10. The ramp of claim 1, wherein the first outer rail is in contact with the first middle rail when the ramp is fully horizontally collapsed.

11. The ramp of claim 1, further comprising a second middle rail, wherein:
    each crossbeam further comprises a third crossbeam section, co-axial to the first crossbeam section and the second crossbeam section;
    the third crossbeam section is coupled to the second middle rail;
    the second crossbeam section fully encompasses the third crossbeam section when the ramp is fully horizontally collapsed; and
    the third crossbeam section fully encompasses the first crossbeam section when the ramp is fully horizontally collapsed.

12. The ramp of claim 11, wherein the second middle rail is in contact with the first middle rail and the first outer rail when the ramp is fully horizontally collapsed.

13. The ramp of claim 2, further comprising:
    a fully collapsed configuration, comprising the ramp in its horizontally collapsed configuration and its vertically collapsed configuration; and
    a fully expanded configuration, comprising the ramp in it horizontally expanded configuration and its vertically expanded configuration, wherein the ramp is configured to support a vehicle in:
      its fully expanded configuration;
      its collapsed configuration;
      its vertically collapsed configuration and its horizontally expanded configuration; and
      its vertically expanded configuration and its horizontally collapsed configuration.

14. A process for deploying a portable ramp, the process comprising:
    providing a ramp comprising:
      a first outer rail, having a top end and a bottom end, wherein the distance of the first outer rail from the top end to the bottom end is equal to the length of the ramp;
      a second outer rail, wherein the distance from the first outer rail to the second outer rail is equal to the width of the ramp;
      at least one hinge connecting a first section of the first outer rail to a second section of the first outer rail;
      a first middle rail; and
      a plurality of adjustable, telescoping crossbeams connected between the first outer rail and the second outer rail, each crossbeam having a first end and a second end and comprising at least two crossbeam sections, wherein:

a first crossbeam section is coupled to the first outer rail at the first end of the crossbeam;

a second, hollow, crossbeam section co-axial to the first crossbeam section is coupled to the first middle rail;

the second crossbeam section is coupled to the second outer rail at the second end of the crossbeam;

the second crossbeam section encompasses the first crossbeam section when the ramp is fully horizontally collapsed; and the distance from the first end of the crossbeam to the second end of the crossbeam of the crossbeam, added to the width of the first outer rail and the second outer rail is equal to the width of the ramp;

unfolding the ramp at the at least one hinge; and adjusting the width of the ramp by telescopically expanding each crossbeam, wherein the distance between the first outer rail and the first middle rail increases when the ramp is horizontally expanding.

15. The method of claim 14 further comprising attaching the ramp to the back of a platform.

16. The method of claim 15 wherein the platform is a truck bed.

17. The method of claim 15 further comprising driving an all-terrain vehicle up the ramp on the at least one adjustable crossbeam to the platform.

18. The method of claim 14 further comprising detaching the ramp from the back of a platform.

19. The method of claim 14 further comprising transporting the ramp on an all-terrain vehicle for future use as a bridge to go over obstacles.

* * * * *